United States Patent [19]

Gunderson

[11] 3,994,140
[45] Nov. 30, 1976

[54] STINGER COUPLING
[75] Inventor: Richard H. Gunderson, Houston, Tex.
[73] Assignee: Exxon Production Research Company, Houston, Tex.
[22] Filed: Mar. 18, 1976
[21] Appl. No.: 668,094

Related U.S. Application Data
[63] Continuation-in-part of Ser. No. 567,790, April 14, 1975, abandoned.

[52] U.S. Cl. ............................... 61/108; 16/128 R; 403/316
[51] Int. Cl.² ........................................... F16L 1/00
[58] Field of Search ............ 61/72.3, 72.1; 403/316, 403/152, 154; 16/128 R, 171, 176

[56] References Cited
UNITED STATES PATENTS

| | | | |
|---|---|---|---|
| 3,538,712 | 11/1970 | Lochridge | 61/72.3 |
| 3,554,588 | 1/1971 | Reinsma et al. | 403/154 X |
| 3,922,870 | 12/1975 | Recalde | 61/72.3 |

Primary Examiner—Jacob Shapiro

[57] ABSTRACT

The disclosure is directed to a coupling assembly which serves to connect a pipelaying stinger to a pipelaying vessel and is of the type wherein laterally spaced, disconnectable joints interconnect the stinger and vessel. The spaced joints are each comprised of a tapered male member and a mating female member, normally a pin and receptacle, and are preferably axially aligned to form a hinge which permits the stinger to rotate about a horizontal axis. When the two spaced joints are both engaged the stinger is prevented from rotating in a non-axial manner. However, when one joint is disengaged, the other will disengage as the male and female members rotate about their rotational point of contact.

10 Claims, 7 Drawing Figures

STINGER COUPLING

CROSS REFERENCE TO RELATED APPLICATIONS

This application is a Continuation-In-Part of the United States patent application Ser. No. 567,790, filed Apr. 14, 1975 and now abandoned.

BACKGROUND OF THE INVENTION

1. Field of Invention

The present invention relates to an improved coupling assembly of the type employed to connect a pipelaying stinger to a pipelaying vessel.

2. Description of Prior Art

In laying pipe offshore on the floor of a body of water from a floating vessel in the conventional manner, a pipelaying stinger is employed which extends outwardly from the vessel into the water to support the pipe as it descends towards the bottom. Normally the stinger is rotatably pinned to the pipelaying vessel at two spaced, connecting points, which are aligned to form a hinge. This allows pivotal movement of the stinger about a horizontal axis to the desired angular position for support of the pipe being laid.

Failure to provide a stinger to support the pipe may result in the weight of the pipe developing large stresses that can buckle or rupture the segment of the line suspended between the vessel and the ocean floor. The problem of proper pipe support is compounded significantly in deep water, in heavy seas or with large diameter pipe, requiring the use of substantially larger stingers. These elongated outwardly extending structures present severe problems in heavy seas or adverse weather conditions. Because of the size of the stinger, environmental forces acting on it create tremendous bending moments at the coupling, frequently leading to coupling failures. Accordingly, stingers are normally detachably connected to the vessel so that they can be separated from the vessel during heavy seas or other adverse weather conditions.

Disconnection and reconnection of the stinger from the vessel during heavy seas are, however, also complex tasks and pose the possibility of damage to either the vessel, stinger, or coupling therebetween. When one of the two spaced joints is connected or disconnected before the other, even a relatively small lateral movement of the stinger with respect to the vessel, due to the length of the stinger, will produce tremendous forces which often result in damage to the coupling. In heavy seas it is difficult to connect or disconnect the two joints simultaneously, and the likelihood of damage to the coupling, vessel or stinger is significant.

SUMMARY OF THE INVENTION

The present invention at least partially alleviates the problems outlined above. Briefly, the present invention provides a new and improved apparatus for coupling a pipe support stinger to a pipelaying vessel, either directly to the vessel hull or to a support ramp connected to the vessel and forming a part thereof. The apparatus includes a first pair of connectors mounted at spaced positions on the stinger and a second pair of spaced connectors mounted on the vessel. Means are provided to move the vessel connectors and stinger connectors into engagement with each other to form a pair of spaced joints. One connector of each joint is comprised of a male member and the other a female member, normally a pin and receptacle. Preferably, the two joints are axially aligned to form a hinge, permitting the stinger to rotate about a horizontal axis passing through the joints and perpendicular to the stinger.

Further, in accordance with the present invention, means are provided for locking the vessel connectors and stinger connectors together. Whenever the joints formed by the vessel connectors and stinger connectors on both sides are engaged, rotation of the stinger in a non-axial manner is prevented; however, the stinger is free to rotate without imparting any significant force or moment to the hitch or vessel and to ultimately disconnect any time the vessel connector and stinger connector on one side are disconnected with the connectors on the other side engaged, for example, in the event of the failure of both joints to engage or disengage simultaneously during disconnection or reconnection operations. The connectors of each joint disengage without binding due to the mating tapered surfaces of the male and female members. The taper is such that the male member will not intersect the inner surface of the female member as they rotate about the rotational point of contact of the two connectors.

The two connectors mounted on the vessel are preferably surrounded by a guide structure which facilitates movement of the stinger mounted connectors into engagement with those on the vessel. The guide structure preferably includes a tapered alignment plate positioned within a capture chamber, which plate serves to restrict lateral movement of the stinger within the capture chamber during connection and disconnection operations.

DESCRIPTION OF THE PREFERRED EMBODIMENT

Figure 1:
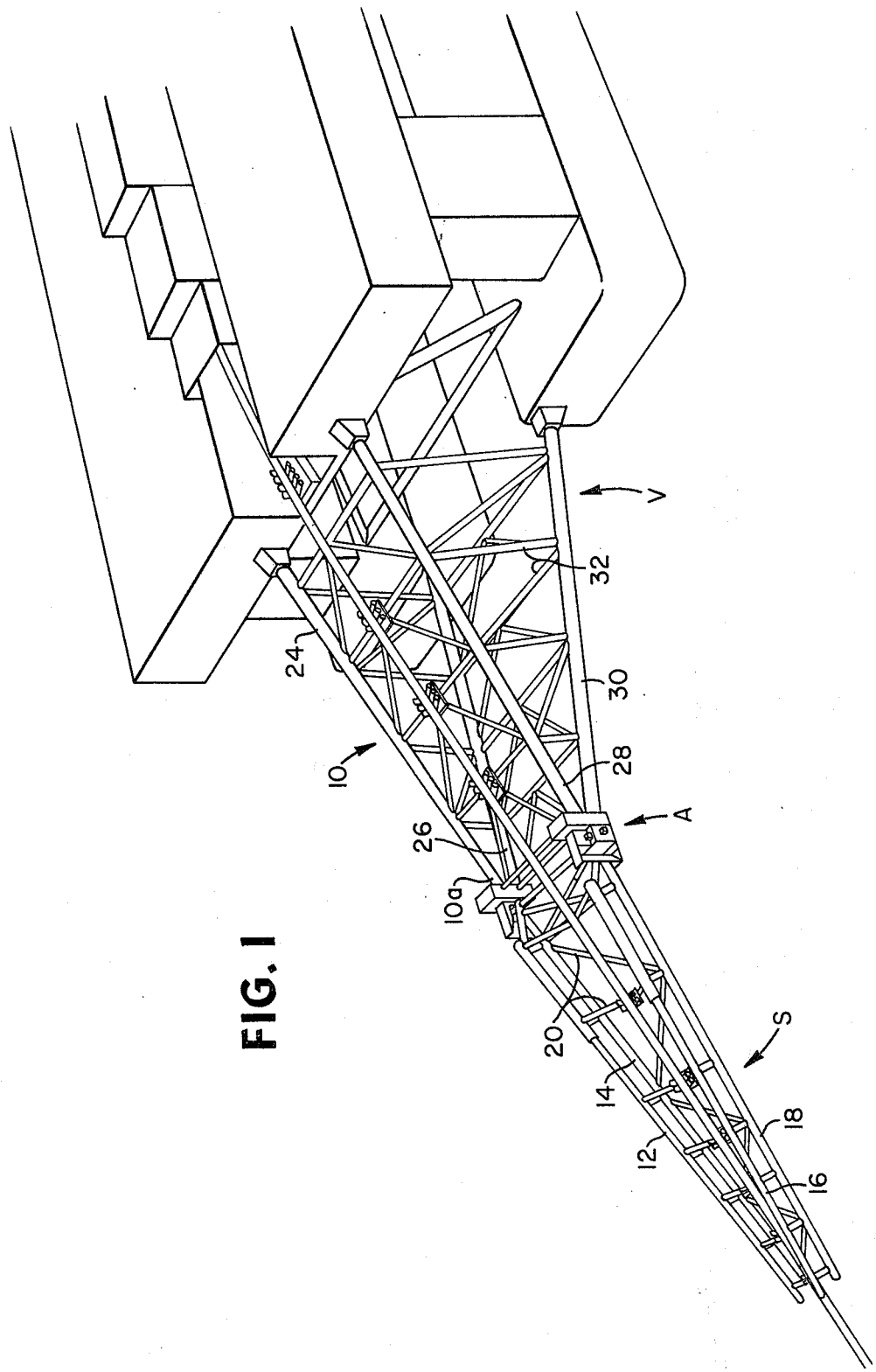
FIG. 1 is an isometric view of a pipelaying vessel and stinger coupled together in accordance with the present invention.

In the drawings, the letter A designates generally the apparatus of the present invention for coupling a pipe supporting stinger S to a pipelaying vessel V, which in the preferred embodiment is a semi-submersible pipelaying vessel as shown in FIG. 1, although it may be some other suitable configuration of marine pipelaying vessel, if desired. As is conventional, the stinger S supports the pipe during movement of the pipe to the floor of the body of water.

As will be set forth in detail, coupling apparatus A permits the stinger S to be attached to and detached from the vessel V with reduced likelihood of damage to both the stinger S and the vessel V, as well as to coupling apparatus A itself. The coupling apparatus of the present invention is shown connecting the stinger to a support ramp 10 which is affixed to and forms a part of the vessel at an outer end 10a of such ramp. It will be understood that the apparatus A may be used to couple a stinger directly to the hull of the vessel where a ramp or other extension is not used. The stinger is also pivotally connected, as will be set forth below, with respect to the ramp 10 by the apparatus A of the present invention, so that the stinger may be moved into a desired angular pipe supporting position. It will be appreciated, however, that the hinge means to permit the stinger to rotate about a horizontal axis could be separate from the coupling between the vessel and stinger without departing from the present invention.

As is conventional, the stinger is formed from a plurality of longitudinally extending support members 12, 14, 16 and 18 (FIG. 1) with suitable cross-bracing designated generally as 20 mounted at appropriate positions along the length of the stinger for strength and support. In a like manner to the stinger, ramp 10 is formed from a plurality of outwardly extending support members 24, 26, 28 and 30. The support members 24 and 26 are rigidly affixed to and extend outwardly from the vessel. They are connected together at the outer end 10a of the ramp. Similarly, the support members 28 and 30 are affixed to the vessel, extend outwardly and are connected in a like manner together at the outer end 10a of the ramp. Suitable crossbracing, designated generally as 32, is mounted between the support members of the ramp 10 for strength and support.

Figure 2:
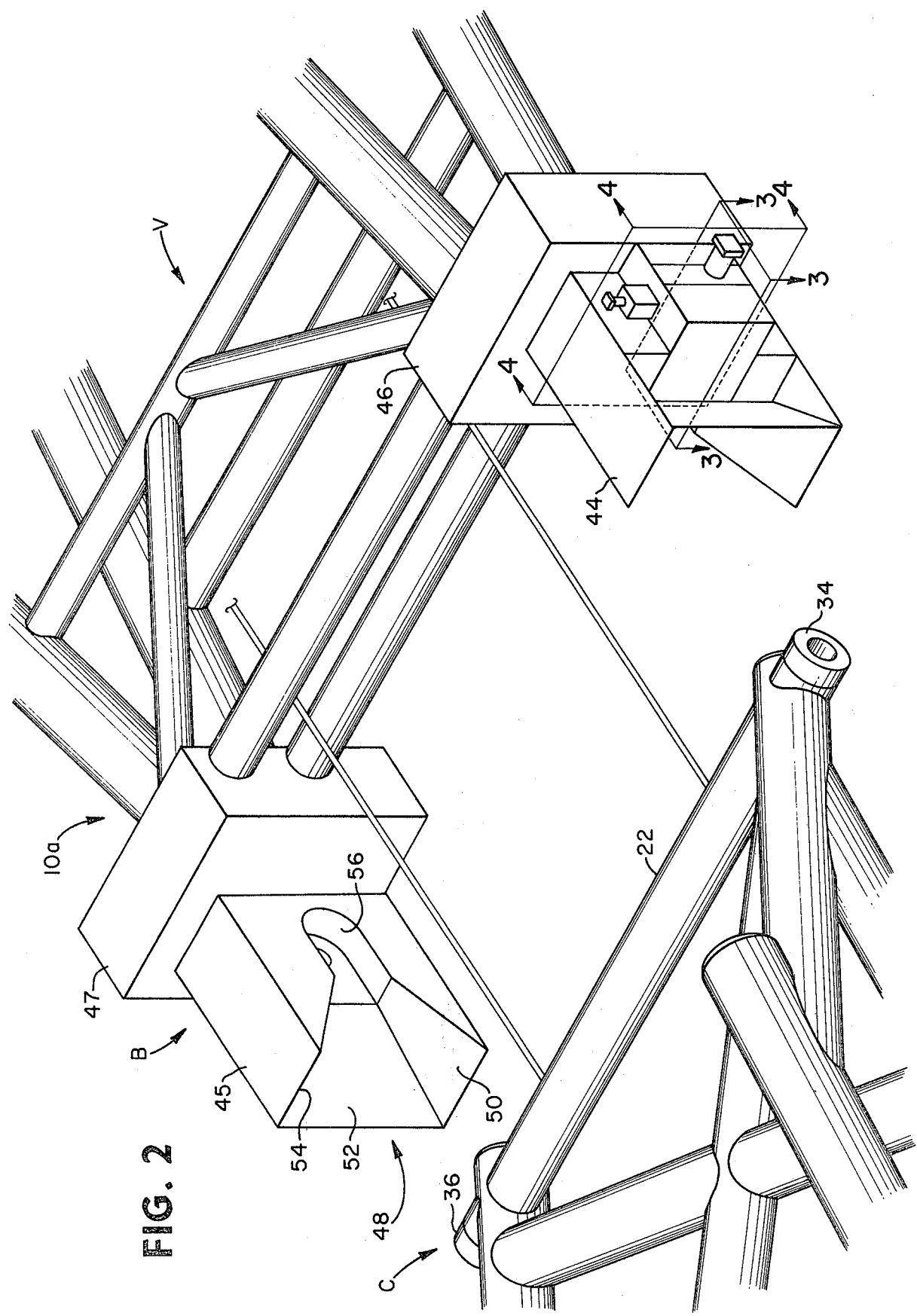
FIG. 2 is an enlarged isometric view of the coupling of FIG. 1.

Turning to FIG. 2 which depicts a preferred embodiment of the coupling apparatus A in detail, the connectors situated on the stinger are designated by the letter C and are comprised of a pair of female members shown as a first receptacle 34 and a second receptacle 36 mounted at spaced positions from each other at opposite ends of a hinge bar 22 of the stinger. Since receptacles 34 and 36 are of like structure and function, description of the details of each will be set forth interchangeably, depending on which is best illustrated in the drawings, it being understood that the structure of the other is identical.

Receptacle 34 (FIG. 3) includes a pin chamber 38 having smoothly curved inner walls formed at one end of hinge bar 22. Inner end 38a of the pin chamber 38 forms a pin contact plate at the base of the pin chamber. Inner wall surface 38b of pin chamber 38 is formed with a curved surface configured to coact with a similarly curved surface of tapered pin 58 situated on the vessel, as will be set forth below.

Vessel mounted connectors B (FIG. 2) include a pair of male members shown as connectors 44 and 45 which are attached to support members 46 and 47, respectively, at the outer end of the ramp 10a of the vessel. Vessel mounted connector members 44 and 45 are adapted to mate with receptacles 34 and 36 in a manner to be set forth below, to form a pair of spaced, coupling joints J (FIG. 3) and couple the stinger to the vessel. Connectors 44 and 45 are of like construction and function, and accordingly, the construction and function of both will be described interchangeably, depending on which is best shown in the drawing.

Considering connector member 45 in more detail (FIG. 2), guide means are provided comprising inlet guide structure 48 which includes guide plate members 50, 52 and 54 arranged to form a contact surface tapering inwardly towards the ramp 10. Inlet guide structure 48 serves to guide the stinger mounted connector, receptacle member 36, into position for engagement with the barge mounted connector 45 to form a coupling joint J. Inlet guide structure 48 also serves as an inlet guide chute or funnel to limit and restrict vertical and lateral movement of receptacle member 36 with respect to the connector 45 during inward movement of the stinger towards the vessel for connection.

Figure 3:
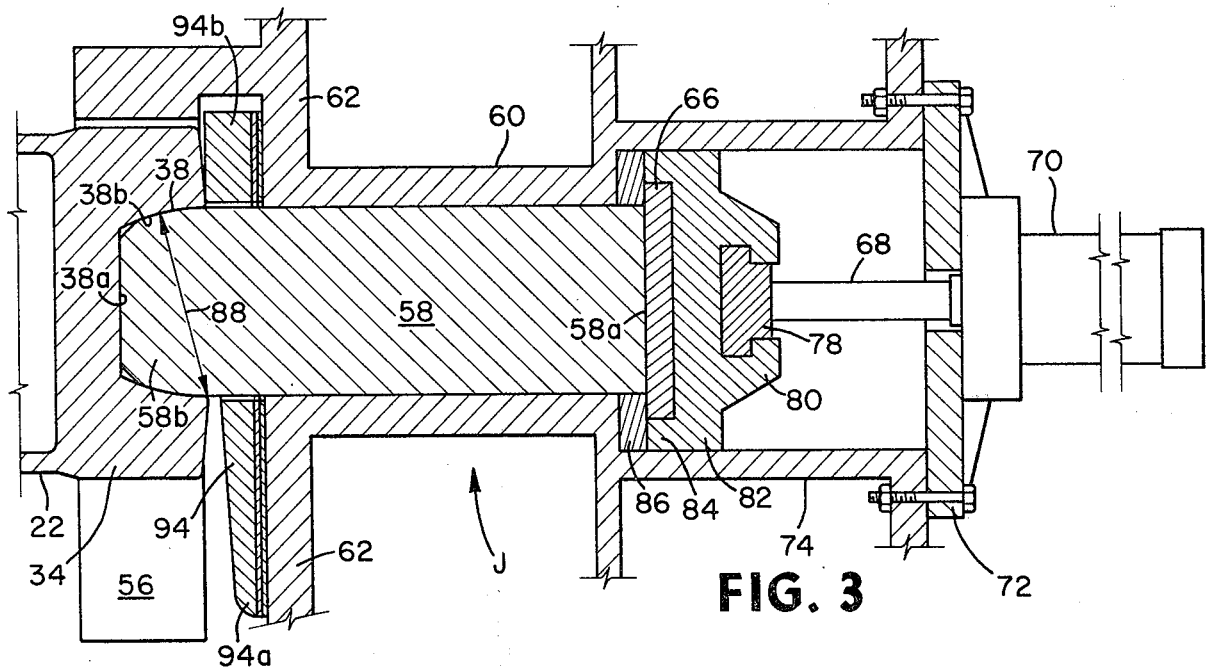
FIG. 3 is a cross-sectional view taken perpendicular to plane 3 of FIG. 2 with the coupling made up showing a pin configured as a cylindrical member with a rounded end.

A capture chamber 56 is formed within vessel mounted connector 45 at the termination of guide structure 48 to receive the stinger mounted receptacle 36 in position for forming the coupling joint. As shown in FIG. 3, pin 58 of vessel mounted connector 44 is mounted adjacent capture chamber 56 of connector 44 and is movable inwardly and outwardly with respect to receptacle 34 to form a coupling joint.

Pin 58 is mounted within a pin housing 60 for relative movement inwardly and outwardly through a side wall 62 into pin chamber 38 of receptacle 34. Although not shown, a bushing may be mounted between pin 58 and pin housing 60 to facilitate relative movement therebetween. In this regard it will be noted that pin 58 is also free to rotate within pin housing 60. Means for moving the pin include a pin plate 66 connected to the inner end 58a of pin 58 to connect pin 58 to a pin retraction rod or shaft 68. A retraction nut 78 is mounted at the pin end of piston shaft 68. It is positioned within a receiving socket member 80 formed within locking plate 82, which is mounted by means of an annular mounting ring 84 to an annular retraction plate 86. Mounting ring 84 and retraction plate 86 form a confining chamber to receive an outer end of pin plate 66 therewithin so that movement of the piston shaft 68 of the retraction cylinder 70 causes movement of the pin 58 inwardly and outwardly with respect to receptacle 34 to form and release the coupling joint. The pin retraction rod 68 is connected to a piston (not shown) within pin retraction cylinder 70 which piston is movable hydraulically to cause relative movement of the pin 58 into and out of engagement with receptacle 34. Pin retraction cylinder 70 is mounted by means of a support plate 72 at the outer end of pin housing 60. It will be understood that other suitable means, for example an electric motor, may be used to cause movement of the pin 58 with respect to receptacle 34, if desired.

Figure 4:
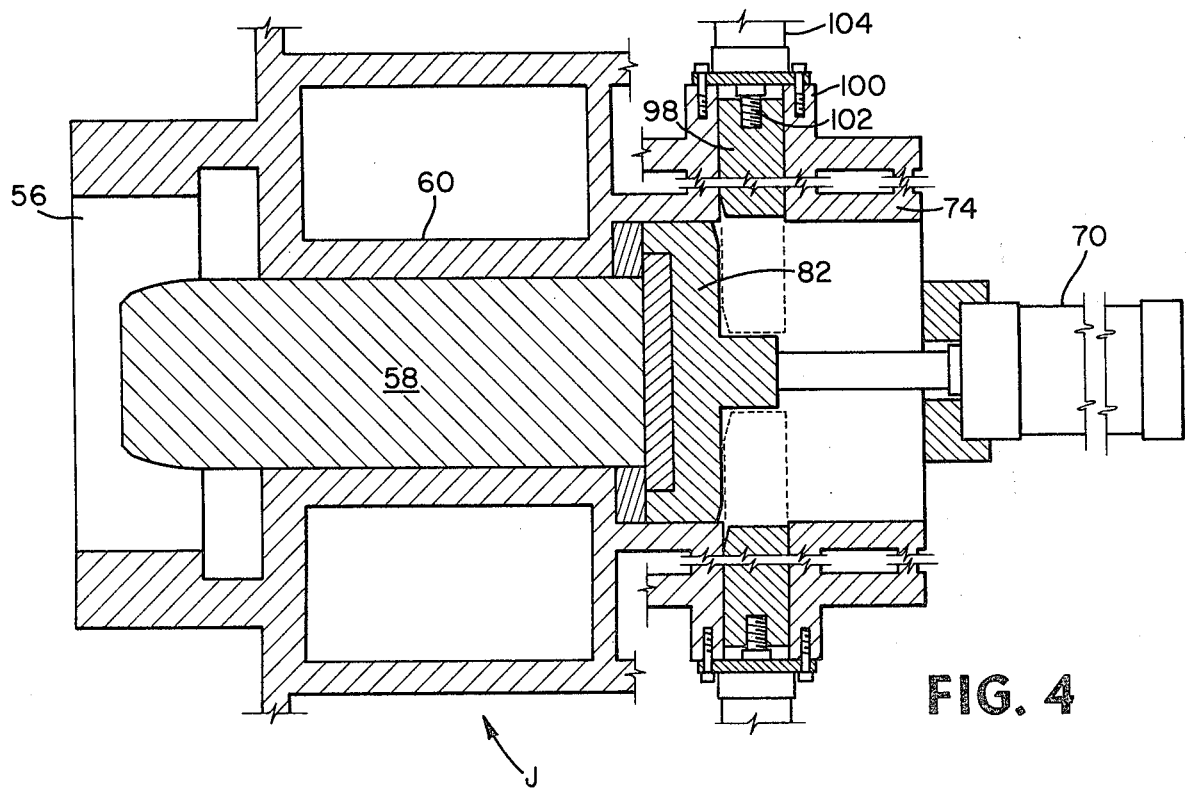
FIG. 4 is a cross-sectional view taken perpendicular to plane 4 of FIG. 2 with the coupling made up showing the pin depicted in FIG. 3.

Means for locking the stinger mounted connector 34 and vessel mounted connector 44 in the engaged position are shown as locking wedges on dogs 98 (FIG. 4) mounted in locking wedge housings 100 for movement inwardly and outwardly with respect to the locking plate housing 74. Locking dogs 98 serve to lock the locking plate 82 in position and thereby lock pin member 58 within pin chamber 38. Locking wedges 98 are mounted by suitable connecting means to a piston shaft 102 which is connected to a piston (not shown) in a locking wedge cylinder 104. The locking wedge cylinder 104 receives hydraulic fluid in order to move the locking wedges 98 from a retracted position (FIG. 4) to an extended position (shown in phantom in FIG. 4), confining locking plate 82 and consequently pin 58 when such pin is in an extended position, to couple the pin 58 and receptacle 34 into locking engagement in the coupling joint. Suitable thrust bearings may be provided between the pin plate 66 and the locking plate 82, if desired.

Receptacle members 34 and 36 of the stinger thus receive the connecting pins of the vessel mounted connectors 44 and 45 to form a pair of spaced coupling joints. Due to the length of the stinger S, and since the stinger connector members 34 and 36 are at spaced positions from each other, tremendous amounts of torque and force can be exerted on the connected one of the two coupling joints J when one of the coupling joints is connected or detached before the other in the event of even relatively minor movement of the stinger S. Accordingly, the outer end 58b of the pin 58 is tapered to coact with the tapered inner surface 38b of pin chamber 38 so that relative movement leading ultimately to disengagement is permitted between receptacle 38 of the stinger connector and pin 58 of the vessel mounted connector in each coupling joint.

The tapered surface of outer end 58b is preferably a curved surface defined by an arc of a circle whose radius, as indicated by a line 88, is equal to the diameter of the pin 58. In this manner, in the event one of the coupling joints J is released or engaged before the other, the inner surface 38b of receptacle 34 will slide relative to the outer surface of outer end 58b of pin 58, permitting rotation and ultimately disengagement of pin receptacle 38 and pin 58.

An aligner plate 94 may be mounted with the side wall 62 of the capture chamber 56 to restrict lateral movement of the stinger mounted receptacle 34 while it is positioned within capture chamber 56. The aligner plate 94 is a tapered member of increasing thickness from an outer portion 94a to an inner portion 94b in the direction of inward movement of the stinger receptacle 34 relative to connector 44 and serves to increasingly restrict lateral movement of receptacle 34 with respect to connector 44 during inward movement of the stinger with respect to the vessel. The tapered guide plate 94 also serves to confine receptacle member 34 in the connected position within capture chamber 56.

Figure 5:
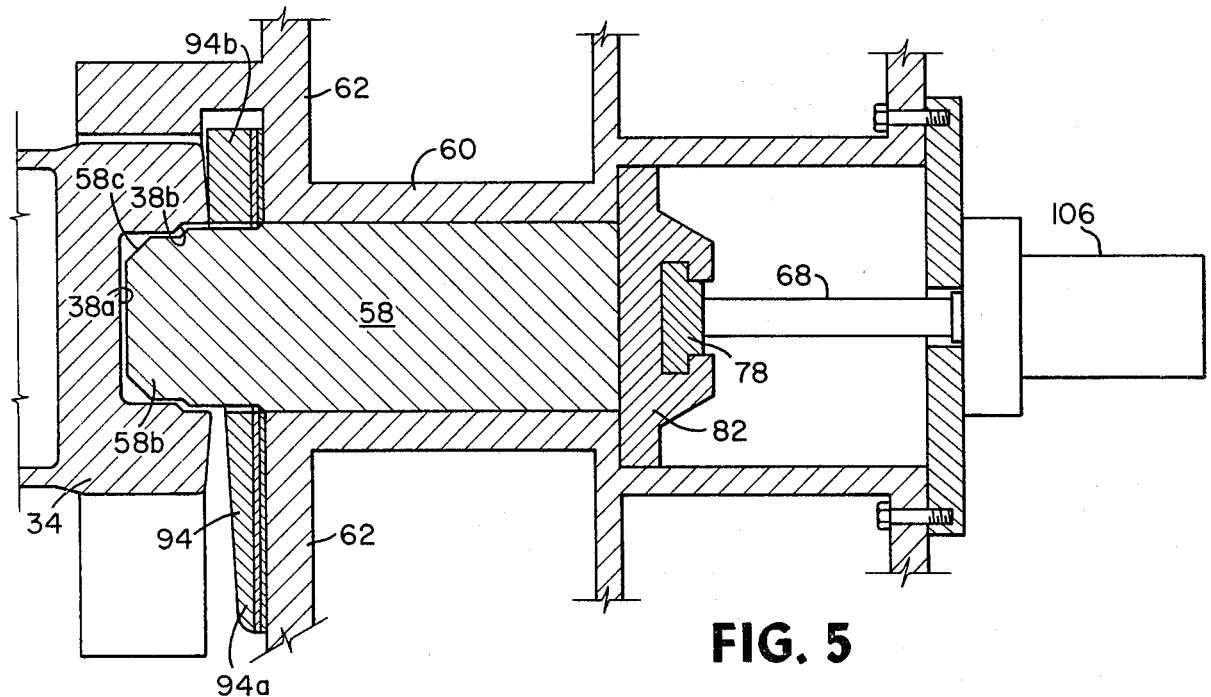
FIG. 5 is a cross-sectional view similar to FIG. 3, showing another embodiment of the invention in which the pin is configured as a stepped shaft.
Figure 6:
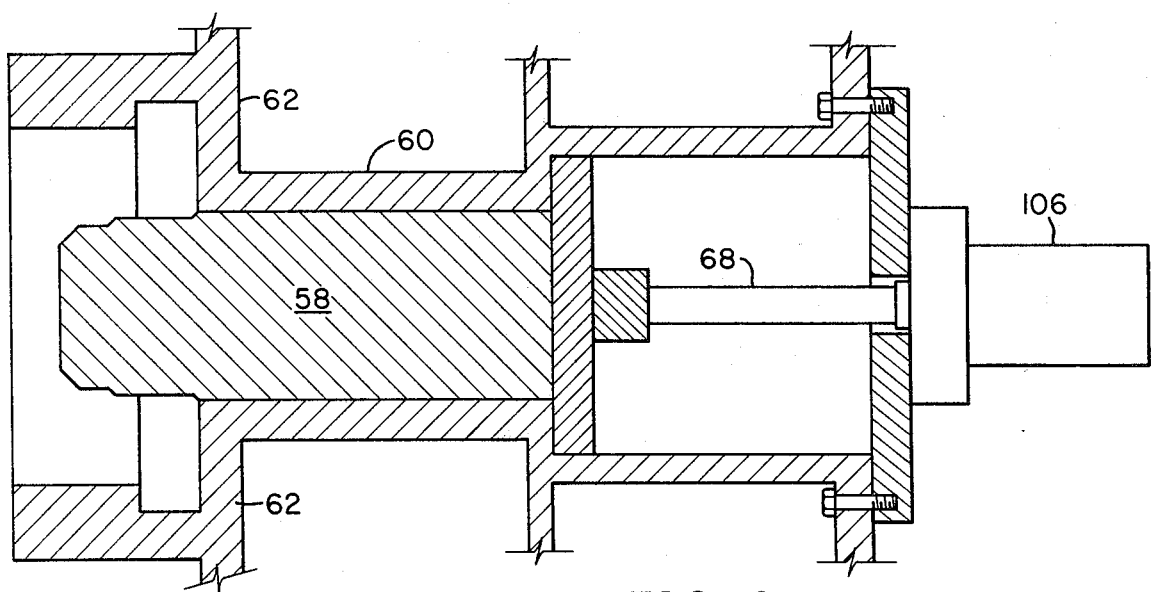
FIG. 6 is a cross-sectional view similar to FIG. 4, showing the embodiment of the invention depicted in FIG. 5.

Turning to FIGS. 5 and 6, another embodiment of the apparatus of the invention is shown. Like numerals are used to designate those parts of the apparatus which are identical to those depicted in FIGS. 3 and 4 and discussed above. The outer end 58b of pin 58 which extends into pin chamber 38 of receptacle 34 will be noted to be tapered in a different fashion from that depicted in FIGS. 3 and 4. It is configured as a cylindrical member stepped to have an increasingly smaller diameter in the direction of receptacle 34. Outer end 58b of pin 58 additionally includes a beveled surface 58c. Inner wall 38b of pin chamber 38 is also tapered to have a stepped inner surface similar to that of pin 58. The stepped and beveled pin is designed with appropriate clearances between it and receptacle 38 such that pin 58 will not intersect the inner wall 38b of pin chamber 38 as the connectors rotate relative to each other and ultimately disengage, thereby preventing damage during connection and disconnection operations where both pins fail to engage or disengage simultaneously. In addition, the pin depicted in FIGS. 5 and 6 is free to move inwardly and outwardly, but is not free to rotate within housing 60. Also, pin retraction cylinder 70, locking wedge 98 and locking wedge cylinder 104 have been replaced with a locking hydraulic cylinder designated by numeral 106 which serves the same function. Such locking hydraulic cylinders are commercially available and are, for example, used to control movement of the rams on subsea blowout preventers employed in drilling wells offshore.

Figure 7:
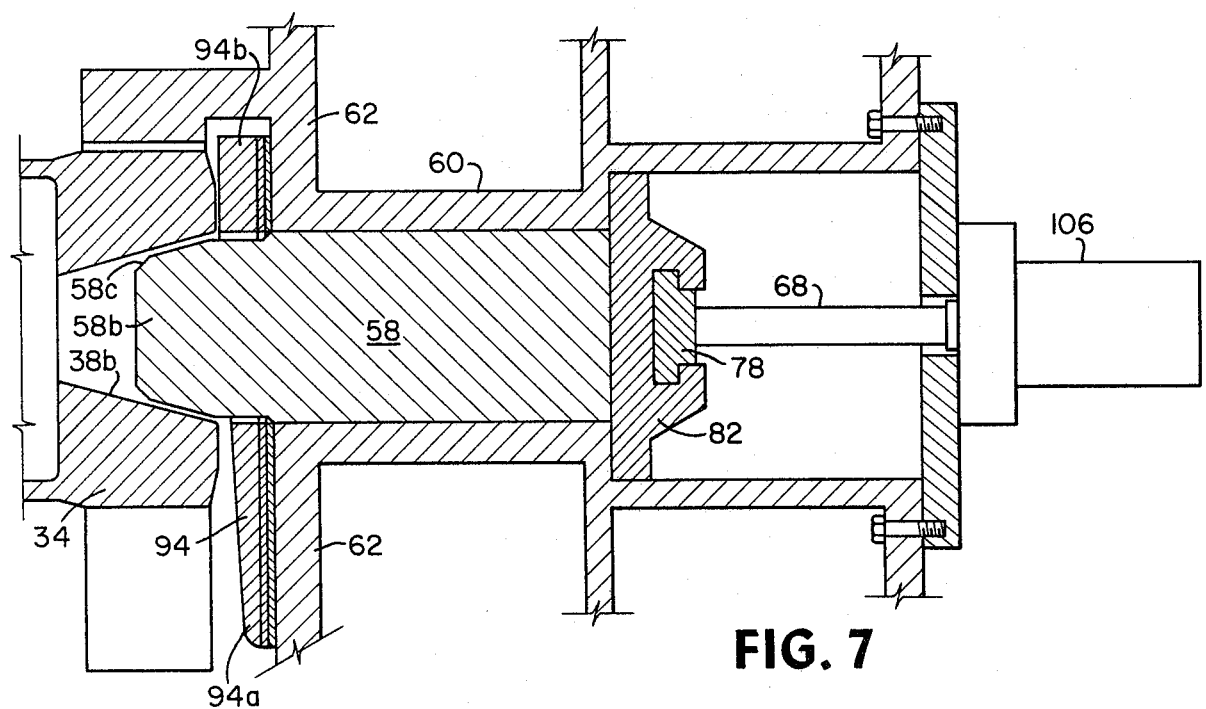
FIG. 7 is a cross-sectional view similar to FIG. 3, showing still another embodiment of the invention in which the pin is configured as a tapered truncated conical shaft.

FIG. 7 illustrates still another embodiment of the present invention wherein like numerals have been used to identify those elements of the apparatus which are identical to those depicted in FIGS. 3 and 4 or FIGS. 5 and 6 and discussed above. Outer end 58b of pin 58 is tapered to form a frustum of a cone. Outer end 58b of pin 58 also includes a beveled surface 58c. The inner surface 38b of pin chamber 38 is similarly formed as a frustum of a similar cone to coact with pin 58. The clearances between the pin and receptacle are sized and the beveling of the pin selected as appropriate to allow chamber 38 to rotate with respect to pin 58 and ultimately disengage, allowing the stinger to disengage from the vessel when only one joint is engaged without damage to the coupling apparatus.

While only three configurations of tapered pins and receptacles have been depicted in the drawings, it will be clear that other shapes of pins and receptacles can readily be constructed consistent with the invention. It is, however, important that adequate bearing surface be provided to secure the stinger to the vessel and that the shape of the male and female members of one joint permits disengagement of that joint when the other joint is disengaged. Generally, the shape of the taper of the male member and the corresponding shape of the female member should be such that the male and female will not bind when these members are disengaged in a non-axial manner. The male and female members will not bind if the taper of a specific design is such that the male member will not intersect the inner mating surface of the female member as the male member rotates about the rotational point of contact. The rotational point of contact is the point of contact between the connectors about which they rotate as they disengage in a non-axial manner. In FIG. 3, if the female connector and receptacle 34 are rotating in a counter-clockwise manner, the points of contact between the male and female connectors will lie along the outer surface of aligner plate 94 where receptacle 34 contacts it.

In cases where the rate of taper is either constant or increasing toward the mating end of the male member, the male and female members will not bind during disengagement if the male member lies within the arc of a circle having a radius equal to the male member's diameter and its center at a rotational point of contact assumed to be a point of contact between the connectors at the male member's circumference where it emerges from its connector. Additionally, since the stinger can be rotating in a plane other than horizontal as the connectors disengage, the assumed rotational point of contact may be anywhere on this circumference. Therefore, it will generally be preferred to have a taper which is symmetrical about the longitudinal axis of the male member. The male and female members of FIG. 3 have a taper designed accordingly. The radius 88 of this circle is shown diagramatically in FIG. 3.

The design of the male member, according to the above, assumes that the rotational point of contact is at the closest possible point to the male member. With a taper designed accordingly, the male and female members will disconnect without binding irrespective of the location of the rotational point of contact. It should be understood that the rotational point of contact can be at a location some distance from the male member and the greater this distance is, the less the male member needs to be tapered. Also, due to the clearance space between the male and female members, the allowable taper can be slightly less than discussed and one skilled in the art can make minor adjustments.

In cases where at any point along the male member's engagement length, the rate of taper decreases toward the mating end of the male member, it will be appreciated that a much more complex situation exists than discussed above. When the rate of taper decreases at any point, it is possible that the male member could be within the circular arc drawn about the rotational point of contact but that the taper will not allow disengagement of the connectors. Additionally, if the rotational point of contact moves during disengagement, a male member with a decreasing rate of taper at some point along its length may not be within the circular arc drawn about the first rotational point of contact but will allow disengagement due to the movement of the rotational point of contact.

One skilled in the art can appreciate that whether specific male and female members will allow the connectors to disengage without binding depends on many variables including the geometry of the taper, the length of the male member penetrating the female member, the clearance between the male and female members when engaged, and the location and movement of the rotational point of contact as the connectors rotate to disengage.

In the operation of the present invention, when it is necessary or desirable to disconnect the stinger from the vessel, such as for inclement weather or heavy seas, the pin retraction apparatus is activated and the pins 58 are withdrawn into the pin housings 60 to release the joints formed between the receptacle members 34 and 36 and the barge mounted connectors 44 and 45, respectively. In the event that the connectors forming one of the two coupling joints do not release, while the other coupling joint does release, pin 58 and receptacle 34 permit relative pivotal movement therebetween in the unreleased coupling joint so that the stinger is free to move with respect to the vessel and to ultimately disengage, preventing damage to the unreleased coupling joint.

To reconnect the stinger to the vessel, a cable or other suitable structure is attached to the stinger from the barge and the stinger is moved inwardly for connection to the vessel. As the stinger is moved inwardly, the receptacle members 34 and 36 are brought into contact with the guide plates of the barge connectors 44 and 45 which serve to confine and restrict relative movement between the stinger and vessel during inward movement of the stinger with respect to the vessel. As inward movement of the stinger continues, the stinger connector members 34 and 36 are brought into the confining capture chambers 56 of the connector members 44 and 45.

Once the members 34 and 36 of the stinger S are positioned within the capture chambers of the barge mounted connectors 44 and 45, respectively, the pin retraction cylinders 70 are activated and the pins 58 of the barge mounted connectors 44 and 45 moved outwardly into the receptacle members 34 and 36 to lock and connect the stinger to the ramp 10 and form coupling joints J. The locking wedge cylinders 104 are then activated to move the locking wedges 98 outwardly into the interior of the locking plate housing 74 to engage the locking plate 82 and lock the pins 58 into engagement in the receptacle members 34 and 36. Alternatively, in the embodiments of FIGS. 5–7 locking hydraulic cylinders 106 are activated to move pins 58 into engagement with receptacle members 34 and 36 and to lock them in place.

The foregoing disclosure and description of the invention are illustrative and explanatory thereof, and various changes in the size, shape and materials as well as in the details of the illustrated construction may be made without departing from the spirit of the invention.

What is claimed is:

1. Apparatus for coupling a pipelaying stinger to a pipelaying vessel comprising a first pair of connectors positioned on said stinger and spaced laterally one from the other, a second pair of connectors positioned on said vessel and spaced laterally to correspond to said stinger connectors, said stinger connectors and said corresponding vessel connectors forming two laterally spaced joints when engaged, the two connectors of each joint have a rotational point of contact when said connectors are disengaged in a non-axial manner, one connector of each joint having a male member and the other connector having a female member, said male member and said female member having mating tapered surfaces, said taper being such that said male member will not intersect the inner mating surface of said female member as said male member rotates about said rotational point of contact, and means for moving opposed male and female members into engagement with one another to form two laterally spaced joints which prevent rotation in a non-axial manner when both are engaged.

2. The apparatus of claim 1 wherein each said joint permits rotation about a horizontal axis therethrough and said joints are aligned to form a hinge, permitting the stinger to rotate with respect to the vessel about a horizontal axis through said hinge.

3. The apparatus of claim 1 further including means for locking said male and female members into engagement with one another.

4. The apparatus of claim 1 wherein said male member is totally encompassed within the arc of a circle having said rotational point of contact as its center and having a radius which is substantially equal to the diameter of said male member.

5. The apparatus of claim 1 wherein the end portions of each male member and each female member are tapered to form curved surfaces having radii substantially equal to the diameter of said male member.

6. The apparatus of claim 1 wherein the end portions of each male member and each female member are tapered to form truncated conical surfaces.

7. The apparatus of claim 1 wherein the end portions of each male member and each female member are tapered to form stepped cylindrical surfaces.

8. The apparatus of claim 1 further comprising guide means adjacent each vessel connector for guiding the stinger connector into position for forming a joint therewith.

9. The apparatus of claim 8 wherein said guide means includes an inlet guide structure for limiting vertical and lateral movement of the stinger toward the vessel.

10. The apparatus of claim 9 further including a tapered alignment plate of increasing thickness in the direction of inward movement of the stinger towards the vessel for restricting lateral movement of the stinger connector with respect to the vessel connector.

* * * * *